Aug. 13, 1935.　　W. T. SOULIS　　2,010,969
SEMITRAILER
Filed Jan. 26, 1932　　3 Sheets-Sheet 1
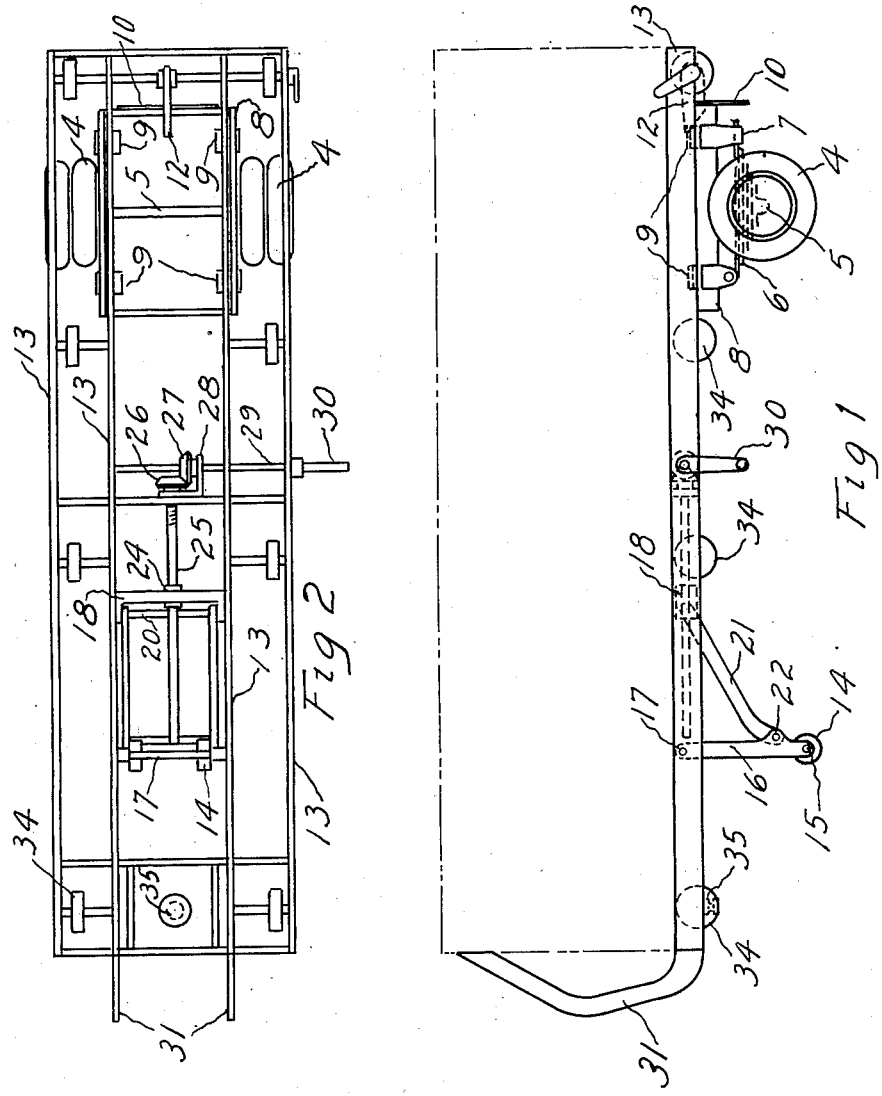
INVENTOR.
Wilbur T. Soulis Aug. 13, 1935.  W. T. SOULIS  2,010,969
SEMITRAILER
Filed Jan. 26, 1932  3 Sheets-Sheet 2
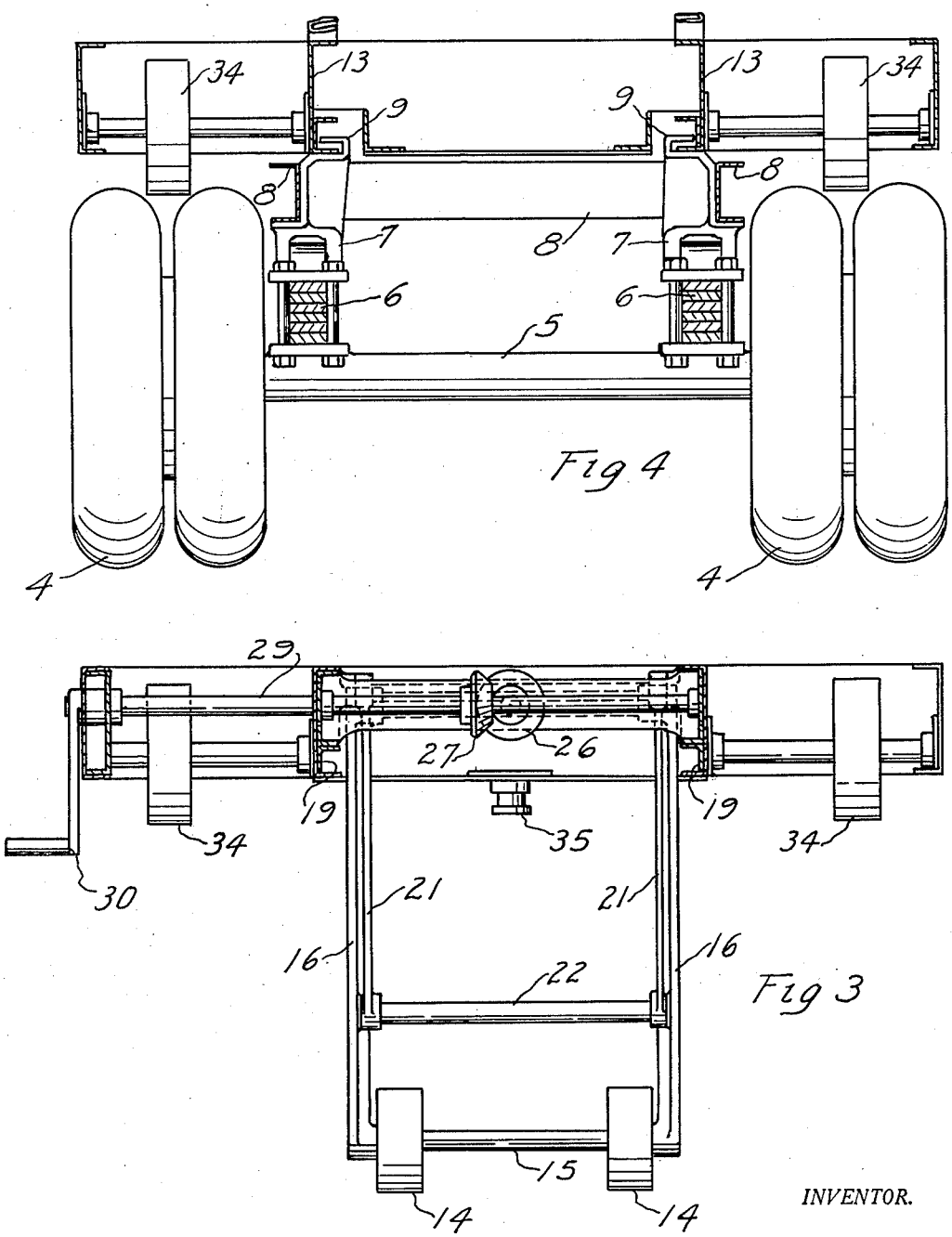
INVENTOR.
Wilbur T. Soulis

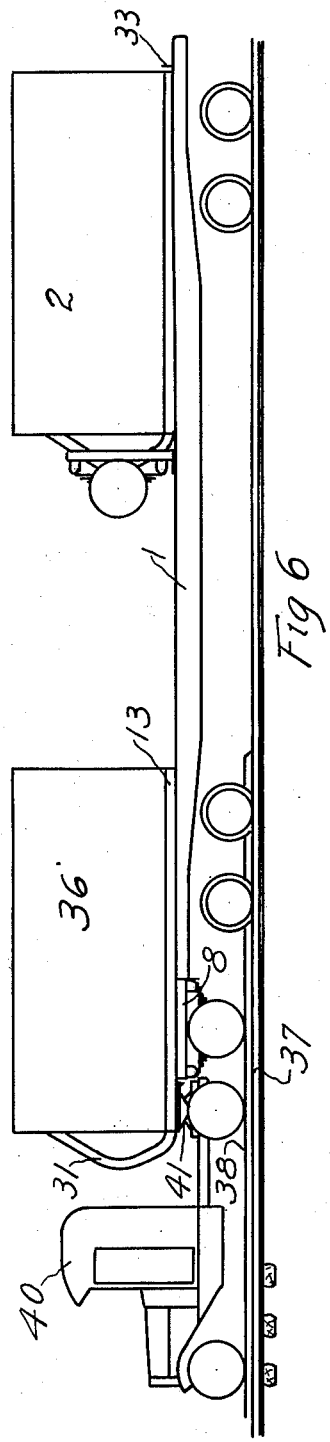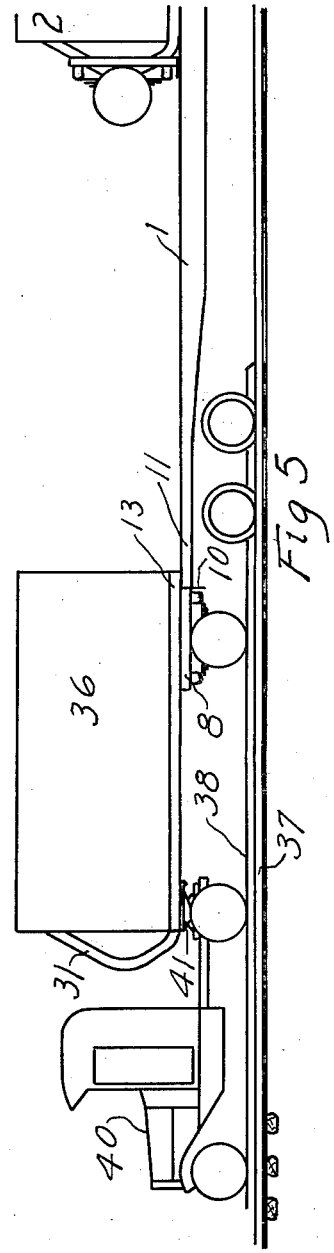

Patented Aug. 13, 1935

2,010,969

UNITED STATES PATENT OFFICE 2,010,969

SEMITRAILER

Wilbur T. Soulis, Easton, Pa., assignor to Harold A. Soulis, Easton, Pa.

Application January 26, 1932, Serial No. 588,887

11 Claims. (Cl. 280—80)

Broadly the object of my invention is to provide a trailer of the two or four point support type, which is adapted to function as a vehicle of transportation in the usual manner and as a container to be bodily carried upon another form of vehicle of transportation as a railroad car, or marine freight craft, or to be deposited upon a loading platform for ultimate transfer to one of the latter classes of transportation vehicles, whereby so-called door to door shipment or transportation and delivery of goods may be effected by the usual operation of my trailer and intermediate haulage or transportation thereof by rail or water, thereby enabling railroads and marine freight carriers to compete upon a favorable basis with motor truck freight and air delivery lines, with a saving in highway maintenance by the reduction in heavy commercial vehicle traffic thereon.

While my invention has a wide range of utility in land, air and marine transportation services, as aforesaid, for the purpose of this disclosure, I have elected to describe it as it may be employed in a combination rail and highway transportation system. However, this is merely illustrative and is not to be construed in any way as a limitation of the scope of application of my invention.

As is well known, where it has been attempted to operate combination highway and rail transportation systems, by employing trailers of the conventional design, the results have been generally unsatisfactory due to the loss of valuable loading space that is occupied by the normally positioned highway vehicle wheels or because of the inability to meet overhead clearance requirements. These disadvantages I have overcome in a simple and highly practical manner and without the necessity of providing costly new railroad equipment, by automatically positioning the vehicle bogie above the frame, when loading on a railroad car. The advantages of this method lie in having the body of the highway vehicle of standard height, and to come within the height limits of practical railroad operation when loaded on a railroad car. The semitrailer, having its own rolling means, can be discharged from the railroad car at any point in the rail system, and without expensive special handling equipment, deliver its freight over the highway, to the consignee. It is obvious that this method reduces the transportation costs, and shortens the time required from shipper to consignee.

An important purpose of this invention is to provide a trailer or a semitrailer with means incorporated in its construction by which its support wheels or semitrailer wheels may be placed in a position above the trailer frame to allow a maximum height of trailer body when loaded on a railroad car or other transportation vehicle. In the transportation of semitrailers on railroad cars, for instance, it is important to allow the semitrailer body floor to be as close to the railroad car floor as possible. This construction permits a maximum of loading space in the semitrailer. The permissible overall height of the semitrailer when loaded on a railroad car, obviously, is limited. Therefore, the semitrailer support wheels must be raised and the semitrailer bogie moved to a position that will allow the semitrailer frame to rest as close as possible to the railroad car floor and my invention contemplates means incorporated in the semitrailer construction to guide the bogie to an elevation above that of the base of the semitrailer when the semitrailer is moved into juxtaposition to and upon a relatively immovable receiving platform or surface.

The semitrailer and railroad car are placed in an end to end position and the semitrailer bogie frame latch is released. The semitrailer is now moved on the railroad car floor. The elevation of the semitrailer frame is above that of the railroad car floor. Therefore the front end of the railroad car floor will contact the rear end of the semitrailer bogie frame. The semitrailer bogie frame is moved along the semitrailer frame to a position where farther movement is prevented by reason of contact with the tractor. The tractor is now uncoupled and driven away. Continued movement of the semitrailer forces the semitrailer bogie upon the semitrailer frame front extension. The semitrailer bogie is now in a vertical position in front of the semitrailer body.

To remove the semitrailer a reverse operation takes place. The semitrailer is moved off the railroad car floor far enough to allow the semitrailer wheels and bogie frame to rest on its guides under the trailer frame to allow the tractor to couple to the semitrailer through the customary commercial fifth wheel. The tractor now pulls the semitrailer off the railroad car floor far enough to allow the semitrailer bogie to be moved to the rear of the semitrailer and latched securely in place. The semitrailer and tractor are now ready to operate as a highway vehicle.

The loading or unloading of the semitrailer from the railroad car requires no special equipment. It is also evident that a standard railroad car may be used without alteration in its construction.

The semitrailer can be loaded on any flat railroad car and unloaded at any convenient point on the railroad system. The semitrailer is self contained and can be coupled to any commercial tractor which has been fitted with a fifth wheel, and moved to the location required to discharge its freight.

I have been able to keep the semitrailer a self contained unit, without sacrificing the loading height of the semitrailer body. The use of this semitrailer would allow the railroad to shorten the time required for freight shipments between shipper and consignee. It will also eliminate the handling of freight on and off the railroad car. Unit shipments can be made from shipper to consignee under seal.

Other objects and advantages from the utilization of my invention will doubtless present themselves as the description proceeds and I would have it clearly understood that I reserve unto myself all rights to the full range of equivalents, both in manner of practicing my invention and its use, to which I may be entitled under my invention in its broadest aspect. For the purpose of the present disclosure, I have elected to describe a certain preferred design. However, as previously pointed out, this is not to be interpreted as a limitation of the scope of my invention, which may be followed with equal success in the manufacture of trailers of other designs.

The accompanying drawings represent, by way of example, one method of carrying out the invention.

In the drawings:

Figure 1 is a side elevation of a semitrailer chassis provided with an extension of the semitrailer frame upon which the bogie is guided to a position in front of the semitrailer body. The support wheels are shown down in this view. The semitrailer body is shown dotted.

Figure 2 is a plan view of a semitrailer chassis.

Figure 3 is an enlarged end elevation, in section, showing the support wheel mechanism and the wheels upon which the semitrailer chassis is moved into position on the railroad car floor.

Figure 4 is an end elevation, in section, showing the semitrailer frame and bogie.

Figure 5 is a side elevation showing one semitrailer moved to a loaded position and one semitrailer in position to be loaded on a railroad car.

Figure 6 is a side elevation showing a tractor coupled to a semitrailer. The semitrailer bogie has been pushed forward by the contact of the railroad car floor with the semitrailer bogie frame. The semitrailer can now be uncoupled and pushed to a loaded position on the railroad car floor.

In Figure 5, reference numeral 1 denotes a flat floored railroad car upon which is loaded a complete semitrailer 2 with another complete semitrailer 36 in position to be loaded on the railroad car. The wheels of the semitrailer 36 rest on an elevation 38 above the railroad car tracks 37 to allow the frame 13 of the semitrailer to pass over the floor of the railroad car 1.

In Figure 6 the semitrailer 36 has been moved to a position where the tractor 40 is uncoupled from the semitrailer. The commercial fifth wheel 41 has means incorporated in its construction to uncouple the tractor 40 from the semitrailer 36.

In Figures 1, 2 and 4, 4 denotes the semitrailer wheels, 5 the semitrailer axle, 6 the semitrailer springs, 7 the semitrailer spring brackets, 8 the semitrailer bogie frame, 9 the semitrailer bogie frame guide plates, 10 the semitrailer bogie frame striker plate, all of which are assembled to form the semitrailer bogie. The semitrailer 36 shown in Figures 5 and 6 is placed in the position shown in Figure 5 and upon being backed against the railroad car floor extension 11 the latter will contact striker plate 10 to disengage the latch 12 shown in Figures 1 and 2 which normally functions to retain the bogie in load supporting position. Of course the latch, if desired may be manually actuatable to unlock the bogie from the semitrailer frame, in lieu of having this operation performed automatically by the action of the aforesaid striker plate. The support wheels 14 shown in Figures 1, 2 and 3, used to support the semitrailer when uncoupled from the tractor should now be in raised position to allow the semitrailer bogie frame 8 to pass to the front of the semitrailer frame 13. The support wheels 14 shown in Figures 1, 2 and 3 are free to turn on the support axle 15, this axle 15 being fitted to support legs 16, which are fulcrumed on shaft 17 fitted to bearings in the semitrailer frame 13. Support slide 18 is guided on the trailer frame 13 by guide angles 19 and is provided with holes into which is fitted shaft 20 over which one end of link 21 is fitted, the opposite end of link 21 being fixed to support leg 16. Support slide 18 has a threaded boss 24 into which fits screw 25. Screw 25 has a bevel gear 26 fixed to one end and has a bearing in bracket 28. Gear 27 is fixed to shaft 29, this shaft having a bearing in bracket 28, the shaft 29 has a crank 30 at its outer end. When the crank 30 shown in Figures 1, 2 and 3 is turned, shaft 29 will rotate and rotate gear 27, this gear rotating gear 26 which will revolve screw 25 and screw into threaded boss 24 of support slide 18, to actuate said slide 18 and its shaft 20 with the links 21 to fulcrum the legs 16 about shaft 17 until support wheels 14 are raised to a position above the lower side of semitrailer frame 13.

As will be noted the bogie, heretofore described, is connected to the trailer frame 13 by the guide plates 9, welded or riveted to the bogie frame members 8 and formed at their upper ends with inwardly offset seats upon which the base of the trailer frame channels are adapted to bear to transmit the load to the bogie assembly in normal highway operation the seat-forming portions being continued upwardly and inwardly to produce a U-shape slot in cross-section within which the lower flange of the channel 13 is located. In the present showing I provide two such guide plates 9, which function as bolsters on each side of the bogie frame in longitudinally spaced relation.

In operation the semitrailer bogie frame 8 with semitrailer wheels 4, semitrailer axle 5, semitrailer springs 6, semitrailer spring brackets 7, semitrailer bogie frame 8, semitrailer bogie frame guide plates 9, semitrailer bogie frame striker plate 10 all attached thereto, are moved forward on semitrailer frame 13 until semitrailer bogie frame 8 and striker plate 10 contact railroad car floor extension 11. With continued backward movement of the semitrailer, bogie frame 8 will traverse the forward and upward portion of the semitrailer frame extension 31 until the bogie frame 8 rests in a vertical position as shown in Figure 5, semitrailer 2. The semitrailer frame extensions are continuations of the central frame members 13, shown in Figure 4. The extensions 31 have a sectional shape similar to frame members 13. The frame guide plates 9 will follow the lower flange of the frame extensions 31. The extensions 31 are continued beyond the frame proper and so shaped in a double angle upward direction, that the trailer wheels 4, will come to rest in front of the trailer body at an elevation above the level of the body frame, when the semitrailer is loaded on a railroad car, shown in Figs. 5 and 6. The exact configuration of the extension shown in the drawings is not necessary. The function of the extensions is to carry the bogie to a position above the bottom elevation of the frame. Therefore any of a number of modifications of that shown in the drawings will carry the bogie to the required position. The frame extensions terminate at the upper ends, close to the semitrailer body, to make possible attachment to the body should this be desired for rigidity. Semitrailer frame 2 Figure 5 now rests on the floor of the railroad car 1 and is held in position by stop shown at 33 Figure 6. Semitrailer frame wheels, shown at 34 Figures 1 and 2 which may be fixed to the frame members 13 or the body in any suitable manner are provided to facilitate the sliding of the semitrailer frame 13, along the railroad car floor. However, these may be omitted if desired. It will be noted that the loading of the semitrailer on the railroad car floor requires a minimum of time and labor. Motion is imparted to the semitrailer through the fifth wheel king pin 35 Figure 1. The fifth wheel may be any one of the commercial types and is attached direct to the tractor frame. The semitrailer is moved as far as possible by the tractor after which motion may be imparted to the semitrailer by one of various methods, the most convenient being the use of manual power.

In operation, my semitrailer 36, as shown in Figures 5 and 6 is coupled to tractor 40 by fifth wheel 41 with the bogie frame 8 in position for highway operation. Bogie frame 8 has striker plate 10 contacting railroad car extension 11 of railroad car 1 upon which semitrailer 36 is to be loaded. Bogie latching means are disconnected and the tractor 40 backs semitrailer 36 over the railroad car floor while bogie frame 8 and bogie parts are stationary. Therefore the rear wheels of tractor 40 will be moved toward the bogie frame 8. When the tractor rear wheels have reached a position shown in Figure 6 the tractor 40 is stopped and the fifth wheel 41 is uncoupled from the semitrailer king pin 35 and driven away to haul another semitrailer over the highway. The semitrailer 36 is now moved along the floor of the railroad car 1 so that the whole of the semitrailer frame 13 rests on the railroad car floor. This last operation forces the bogie frame 8 and bogie parts up to the position indicated on semitrailer 2 in Figure 6. The railroad car 1 is now loaded with semitrailers 36 and 2 and is ready to be hauled over the railroad car tracks 37 to the destination of the semitrailers.

To unload the semitrailer from the railroad car, the semitrailer is moved off the railroad car floor far enough to allow the tractor 40 to couple to the semitrailer as shown in Figure 6. The tractor now moves the semitrailer off the railroad car floor far enough to allow the semitrailer wheels and semitrailer bogie frame 8 to move to the rear of the semitrailer frame 13. The semitrailer bogie frame latch 12 Figures 1 and 2 will lock the semitrailer frame and semitrailer bogie frame securely together.

I claim as my invention:

1. In a semitrailer, the combination of a frame having a track extending from the rear to the front of the semitrailer, said track extending in an upwardly turned direction from said frame, a semitrailer bogie, said bogie having sliding attachment means to said track.

2. In a semitrailer, the combination of a frame having a track extending from the rear to the front of the semitrailer, said track extending in an upwardly turned direction from said frame, a semitrailer bogie, and means of connection between said bogie and said trailer, whereby under an applied force said track will move relatively to said bogie to locate said bogie in a predetermined position relative to said track.

3. A trailer having a body and wheels for rolling support from the ground and means connecting said wheels and the trailer body for relative movement, said means including devices effective to elevate said wheels as they move beyond the end limits of the general contour of said body.

4. A semitrailer having a body, a bogie for normally supporting said body from a road bed to be traversed by said semitrailer, and means connecting said body and said bogie said means including devices for effecting vertical displacement of said bogie from its normal body supporting position to locate the base of said body below the axis of rotation of the bogie wheels.

5. In combination, a semitrailer having a body and rolling supporting means, a tractor, coupling means between said tractor and said semitrailer, a railroad car, means for automatically effecting movement of the rolling supporting means from a position under the said semitrailer body to an elevation above that of the base thereof when uncoupled from said tractor and loaded on said railroad car.

6. In combination, a semitrailer, a frame having a supporting surface and a track extending from the rear to the front of the semitrailer and extending in an upwardly turned direction in front of the semitrailer, a bogie and guiding means on said bogie engaged with said track, said means being adapted to traverse said track to locate said bogie in an upwardly turned position at an end of the semitrailer when loaded upon the supporting surface.

7. In a semitrailer, a frame and a bogie, said frame having means to guide the said bogie from a position under the frame to a position above the elevation of the said frame, and means to automatically lock the said bogie to said frame when said bogie is in its normal position under said frame.

8. A vehicle having a body, means for supporting said body from a road-bed to be traversed by said vehicle, said means including wheels, mountings therefor disposed parallel to the plane of the transverse axis of said body and yieldable devices connecting said body and said mountings for relative movement in the road operation of said vehicle and means connected to said body and said supporting means for effecting the displacement of said supporting means vertically from their normal body-supporting position in response to a predetermined horizontal movement of said body.

9. In combination, a tractor, a railroad car, a semi-trailer adapted to be coupled to said tractor, said semitrailer embodying a body and means for supporting said body from a road-bed to be traversed by said semitrailer and said tractor, said supporting means including a transversely disposed axle, wheels carried by said axle and yieldable devices connecting said axle and said body, and means interconnecting said body and said supporting means whereby said supporting means may be displaced relatively to said body in response to effort applied to said body by said tractor, said railroad car constituting a supporting platform for said body during and following the displacement of said wheeled supporting means.

10. A container adapted to be transported by a railroad car or other carrier, means normally functioning to support said container for operation as a highway vehicle, said means including wheels, mountings therefor and yieldable devices interposed between said mountings and said container, and means connecting said supporting means and said container whereby said supporting means may be displaced relatively to said container from their aforesaid normally functioning position for disposing said container upon such railroad car or other carrier, in response to the movement of said container relatively to such car or other carrier.

11. A highway vehicle adapted to function as a load container for transportation upon another type of wheeled carrier, as a rail car, embodying a load-receiving body, means for supporting said body for operation upon the roadbed of a highway, said means including wheels and mountings upon which said wheels rotate, means of connection between said mountings and said body, said latter means including yieldable suspension devices, and means interconnecting said body and said supporting means formed for changing the normal relative positions of said load-receiving body and said supporting means in response to a predetermined movement of said body to condition said vehicle for disposition upon another wheeled carrier as a load-containing component thereof, the change in the relative positions of said load-receiving body and said supporting means rendering said vehicle inoperative upon the roadbed of a highway.

WILBUR T. SOULIS.